United States Patent [19]

Wenz

[11] 4,412,778
[45] Nov. 1, 1983

[54] TONG ARM ASSEMBLY
[75] Inventor: William Wenz, Millville, N.J.
[73] Assignee: Jeff Company, Inc., Millville, N.J.
[21] Appl. No.: 282,892
[22] Filed: Jul. 13, 1981
[51] Int. Cl.³ .............................................. B66C 23/00
[52] U.S. Cl. ..................................... 414/733; 74/519; 414/738
[58] Field of Search ............... 414/733, 736, 738, 706, 414/710, 714, 917; 74/96, 519; 248/421, 284; 198/412, 486, 617

[56] References Cited

U.S. PATENT DOCUMENTS

| | | | |
|---|---|---|---|
| 1,284,776 | 11/1918 | Richard | 248/284 X |
| 1,766,573 | 6/1930 | Westin | 414/733 |
| 1,766,574 | 6/1930 | Westin et al. | 414/733 |
| 1,835,579 | 12/1931 | Westin | 414/733 |
| 3,703,968 | 11/1972 | Uhrich et al. | 414/738 X |

OTHER PUBLICATIONS

"Industrial Robot System", ASEA, Information YB, 110-302E, YFB, Sep. 1976, Reg. 6704, 758, ed. 3.

Primary Examiner—Robert J. Spar
Assistant Examiner—Donald W. Underwood
Attorney, Agent, or Firm—Duffield & Lehrer

[57] ABSTRACT

A tong arm assembly for carrying and moving a tong head arcuately between two horizontally spaced positions includes a housing having the tong head pivotally connected to one end; the other end of the housing being rotatably mounted to a fixed arm stud. A pair of levers located within the housing have their first ends pivotally connected to an extension of the stud and their second ends pivotally connected to the tong head. As the housing is arcuately moved, the levers maintain the tong head steady and in its proper orientation.

2 Claims, 5 Drawing Figures

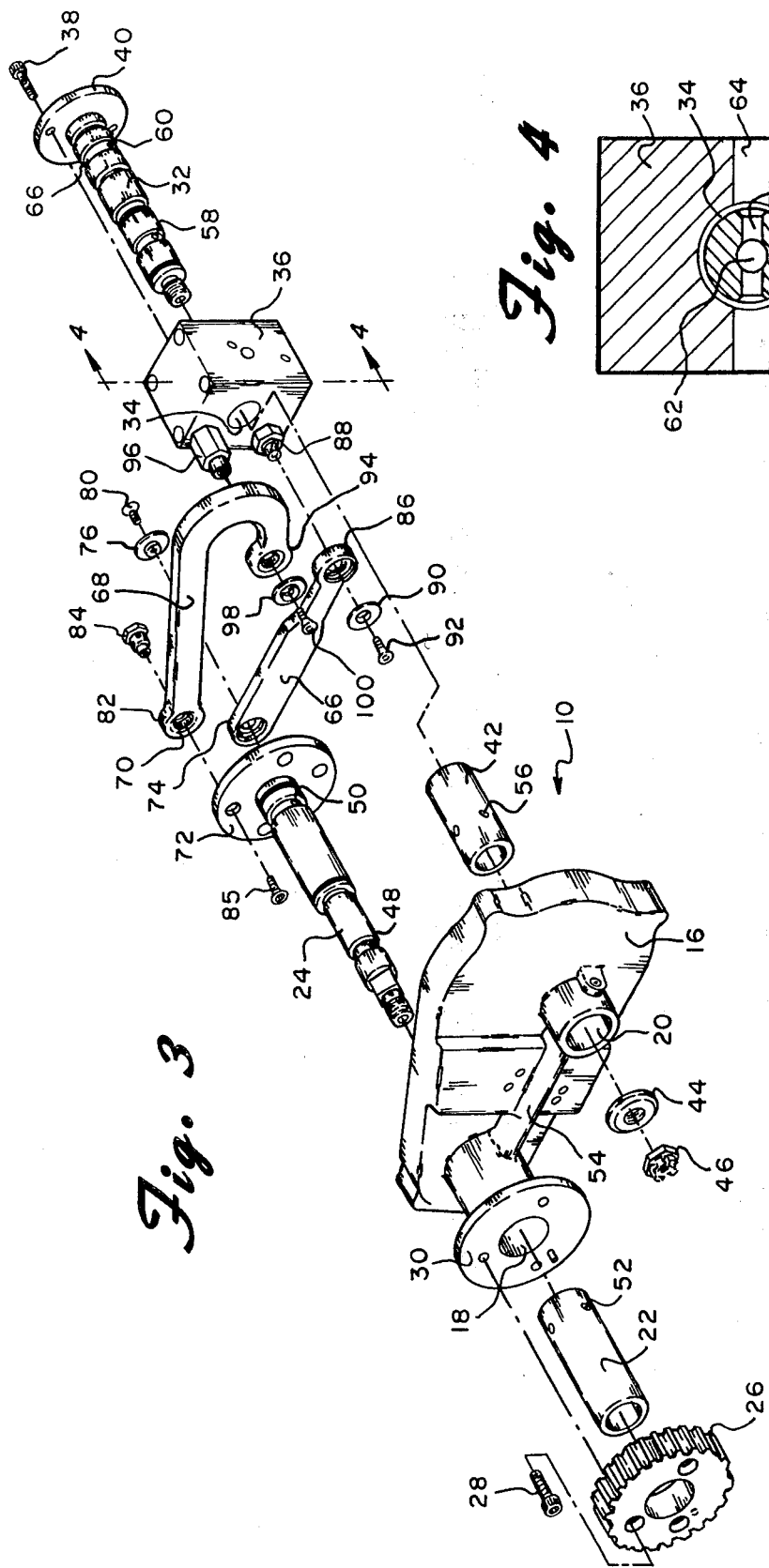

TONG ARM ASSEMBLY

BACKGROUND OF THE INVENTION

The present invention is directed toward a tong arm assembly and more particularly toward such a device which is not subject to wear and which, therefore, is capable of positively maintaining the orientation of glass bottles without rocking as they are being moved from molds to a conveyer belt.

Tong arm assemblies or take-out assemblies as they are sometimes called are well known in the glass forming art. These devices are utilized in automatic bottle forming machines to arcuately move a tong head assembly between a first position overlying the glass forming molds and a second position horizontally remote therefrom overlying a conveyer belt. The tong arm assembly carries a tong head such as described in U.S. Pat. No. 4,185,985. As is well known in the art, the tong head carries one or more tong holders and tongs which pick up the formed bottles or other glassware to move the same from the molds to the conveyer belt.

In order to prevent breaking of the finished bottles, it is very important to strictly maintain the orientation of the bottles in their upright vertical position while they are being moved from the molds to the conveyer belt. This, of course, can only be done if the movement and orientation of the tong head assembly is positively and accurately controlled.

Attempts have been made in the past to provide a tong arm assembly which would positively control the movement of the tong head. A tong arm assembly is shown, for example, in U.S. Pat. No. 3,095,082 and particularly in FIGS. 5 and 6 thereof. This assembly includes a first sprocket mounted on the shaft about which the assembly rotates and a second sprocket remote therefrom and connected to the tong head. A continuous chain interconnects the sprockets so that the two sprockets are forced to move in unison with each other so as to maintain the proper orientation of the tong head.

Unfortunately, after a period of time it has been found that the chains tend to wear as do the sprockets in the area where the chain and sprockets continuously engage and disengage each other. As a result of this wearing effect, there is some minor freedom of movement in the tong head which causes the same to rock thereby resulting in checked or broken bottles. And while devices such as shown in U.S. Pat. No. 3,095,082 have been devised for compensating for the wear of the chain and sprockets, this requires additional and continuous adjustments and eventually the chain and/or sprockets must be replaced.

Another attempt at positively driving the tong head has been the use of a plurality of gears in place of the chain and sprockets. Examples of such gear arm assemblies are shown in U.S. Pat. Nos. 1,859,956 and 3,410,417. In these arrangements, the two sprockets are replaced by gears and an additional idler gear is mounted there between. Unfortunately, this arrangement has also not been totally satisfactory since eventually the gears tend to wear as they mesh again causing the tong head assembly to rock slightly which eventually results in the breaking of the glassware being moved from the molds to the conveyer belt.

SUMMARY OF THE INVENTION

The present invention is designed to overcome the deficiencies of the prior art tong arm assemblies described above and provides a means for accurately and positively moving a tong head arcuately between two horizontally spaced positions. The assembly includes a housing having the tong head pivotally connected to one end. The other end of the housing is rotatably mounted to a fixed arm stud. In place of the conventional sprockets and chain or gears, a pair of levers are located within the housing and have their first ends pivotally connected to an extension of the arm stud. Their second ends are pivotally connected to the tong head. As the housing is arcuately moved, the levers maintain the tong head in its proper orientation and positively steady so as to prevent any rocking of the glassware being carried.

BRIEF DESCRIPTION OF THE DRAWINGS

For the purpose of illustrating the invention, there is shown in the accompanying drawing one form which is presently preferred; it being understood that the invention is not intended to be limited to the precise arrangements and instrumentalities shown.

FIG. 3 is an exploded view of the tong arm assembly showing the details of construction thereof;

FIG. 4 is a cross-sectional view taken through the line 4—4 of FIG. 3, and

DETAILED DESCRIPTION OF THE PREFERRED EMBODIMENT

Figure 1:
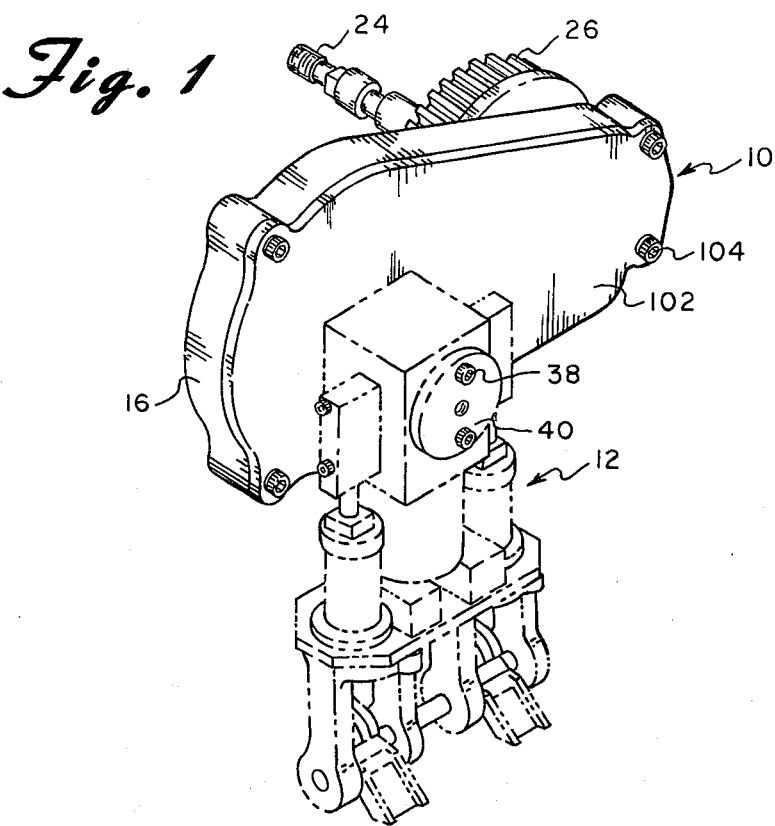
FIG. 1 is a perspective view of a tong arm assembly constructed in accordance with the principles of the present invention.

Referring now to the drawings in detail wherein like reference numerals have been used throughout the various figures to designate like elements, there is shown in FIG. 1 a tong arm assembly constructed in accordance with the principles of the present invention and designated generally at 10. As is generally known in the art, the purpose of a tong arm assembly is to arcuately move a tong head assembly 12 about a fixed arm stud 24 which is mounted on the glass making machinery between the molds and take-out conveyer. The tong head assembly 10 is shown in phantom in FIGS. 1 and 2 since it does not, per se, form a part of the present invention. Furthermore, since the tong head assembly is known in the art, the details thereof will not be explained. The particular tong head assembly 12 illustrated in the drawings is a double gob assembly manufactured by Jeff Company, Inc. of Millville, N.J.

The details of the tong arm assembly 10 are shown most clearly in FIG. 3. The assembly 10 is comprised of a housing 16 having an opening 18 at one end thereof and a similar and parallel opening 20 at the other end. After a bushing 22 is inserted into the opening 18, an arm stud 24 passes through the bushing 22 and opening 18 and extends outwardly of the housing that is to the left as viewed in FIG. 3.

The free end of the arm stud 24 which extends outwardly of the housing 16 is intended to be fixedly secured to glass making machinery in a manner well known in the art. The arm stud 24 is held in a fixed position and does not rotate relative to the rest of the machine. Rather, the housing 16 is intended to be rotated about the axis of the arm stud 24. To this end, a gear 26 is bolted by a plurality of screws 28 to the flange 30 fixedly secured to the rear of the housing 16. When the gear 26 meshes with a drive gear or rack, the housing 16 and all components mounted thereon or carried thereby are caused to rotate about the axis of the arm stud 24.

The other end of the housing 16 is intended to carry the tong head assembly 12. In order to accomplish this, a cylinder shaft 32 passes through an opening 34 in the air distribution head 36 of the tong head assembly. The shaft 32 is fixedly secured to the head 36 by a plurality of screws 38 passing through apertures in the flange 40. The free end of the shaft 32 passes through bushing 42 which is forced fit into the opening 20 in the housing 16. Axial movement of the cylinder shaft 32 is prevented by a washer 44 and locknut 46.

Figure 2:
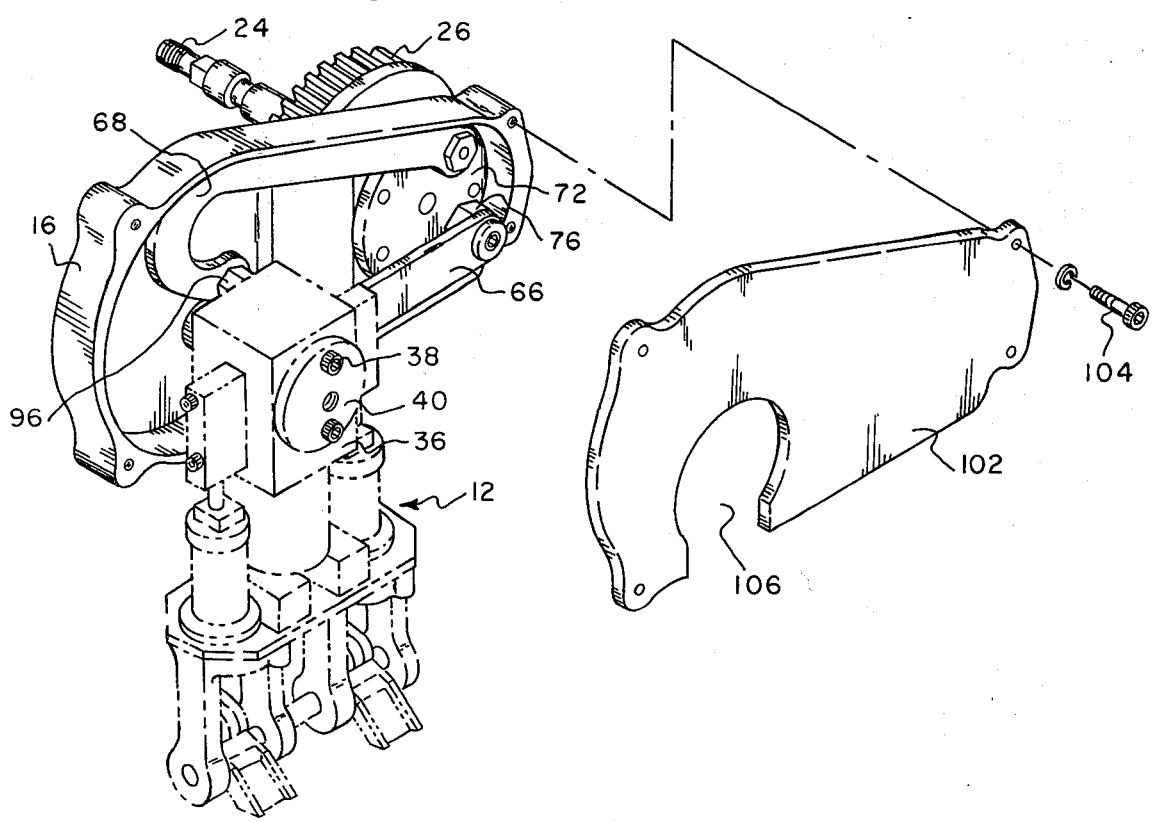
FIG. 2 is a view similar to FIG. 1 but with the housing cover removed.

Tong head assemblies in use today such as tong head assembly 12 shown in FIGS. 1 and 2 are operated by air pressure. Air must, therefore, be provided from an air supply associated with the glass making apparatus to the air distribution head 36. Air from the glass making apparatus passes through opening 48 in the free end of stud 24 and into the hollow interior thereof where it exits through opening 50 axially remote from opening 48. From here, the air passes through openings 52 in bushing 22 and into and through a closed passageway 54 leading from opening 18 to opening 20 in the housing 16. The air then passes through the plurality of openings 56 in bushing 42 thereby entering the interior of shaft 32 through openings 58. Once in the shaft 32, the air passes out through the plurality of openings 60 into the air distribution head 36.

The shaft 32 and the air distribution head 36 are fixed with respect to each other. FIG. 4 shows the manner in which air can pass from the center bore 62 of the shaft 32 out through the openings 60 and then through the air distribution apertures 64 to the tong cylinders. The shaft 32 is undercut in the portion around the openings 60 such as shown at 66 to provide communication between the openings 60 and the apertures 64 regardless of the angular position between the shaft 32 and the head 36.

As explained hereinabove, the purpose of the tong arm assembly is to maintain the vertical orientation of the tong head during the arcuate or swinging movement of the tong arm. This is accomplished in accordance with the present invention by a pair of rigid levers 66 and 68. For the reasons which will become more apparent hereinafter, each end of each of the levers 66 and 68 has an aperture therein which is fitted with a ball bearing or a needle bearing such as shown at 70.

In order to connect the levers 66 and 68 to the stud arm 24, the inward end of the stud arm is provided with a circular flange 72. The first end 74 of the lever 66 is pivotally connected to the flange 72 through the use of a pivot pin 76, a washer 78 and screw 80. The end 74 of the lever 66 is connected to the flange at a point which is a fixed radial distance from the axis of the stud 24. The first end 82 of the lever 68 is similarly pivotally connected to the flange 72 at a second point through the use of a pivot pin 84 and screw 85. In order to prevent interference between the levers 66 and 68, they are connected to the flange 72 at axially spaced positions. This second point is also at a fixed radial distance from the axis of the arm 24 which distance may or may not be equal to the distance between the first point of connection of the end 74 to the axis of the arm stud 24. The first and second points of connection must, however, be angularly offset from each other. In order to prevent locking and provide positive drive, the two points must be angularly spaced from each other by a distance greater than zero but less than one hundred eighty degrees. Ninety to one hundred degree spacing has been shown to be very efficient.

The other end 86 of lever 66 is connected to the air distribution head 36 of the tong head assembly through pivot pin 88, washer 90 and screw 92. Similarly, the other end 94 of lever 68 is connected to the head 36 through pivot pin 96, washer 98 and screw 100. It should be noted that pivot pin 96 is spaced outwardly from the head 36 a distance slightly greater than the pivot pin 88. The purpose of this is, again, to axially space the levers 66 and 68 from each other so as to avoid interference there between.

Figure 5:
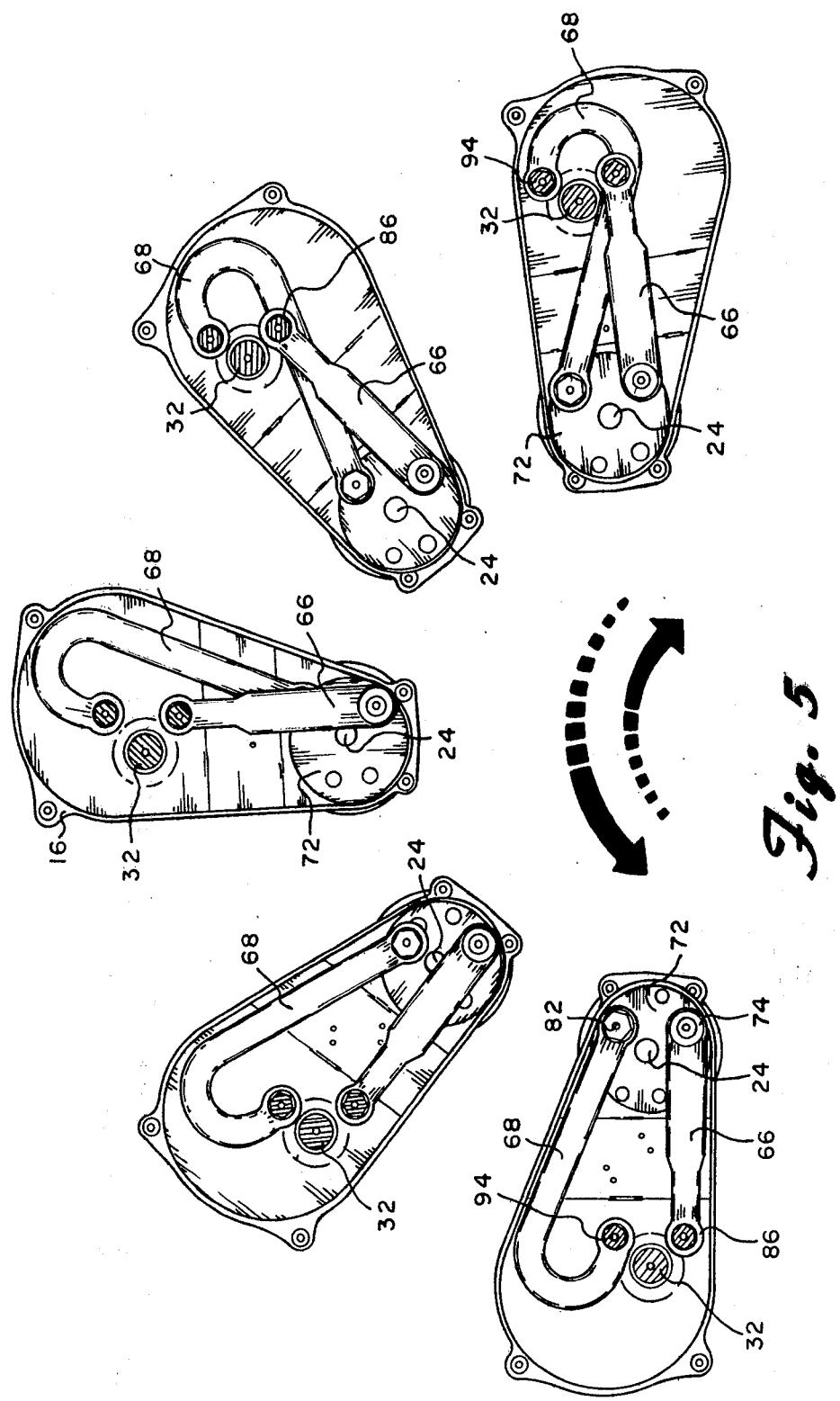
FIG. 5 is a schematic representation of the operation of the tong arm assembly.

As is shown most clearly in FIG. 5, the point of connection between the lever 66 and the head 36 is the same fixed distance to the axis of the shaft 32 as the distance between the connection of the end 74 to the axis of the arm stud 24. Similarly, the distance between the end 94 of the lever 68 to the axis of the shaft 32 is equal to the fixed distance between the point of connection of the end 82 to the axis of the stud arm 24. Even further, the angular positions of the connections between the lever ends 86 and 94 to the head 36 with respect to each other and with respect to the axis of the shaft 32 are equal to the angular positions of the points of connections of the ends 74 and 82 with each other and with respect to the axis of the stud arm 24. It should be noted that while the ends 86 and 94 of levers 66 and 68 are shown to be connected directly to the head 36, this is the preferred embodiment. However, it is also possible to provide the shaft 32 with a flange similar to flange 72 and to then connect the ends 86 and 94 of the levers to the flange which would be located within the housing 16.

The operation of the tong arm assembly is illustrated in FIG. 5. It should be noted that FIG. 5 is a schematic representation only. In reality, the axis of the stud arm 24 does not rotate nor move arcuately as illustrated in FIG. 5. A more correct representation of the operation of the invention would show each of the separate diagrams shown in FIG. 5 as having the axes of the stud arm 24 in axial alignment with each other. The operation is shown more clearly, however, by spacing the diagrams in the manner shown in FIG. 5 which, again, is for illustration purposes only.

As should be readily apparent from FIG. 5, the stud arm 24 and flange 72 are fixed. There is relative rotation between these items and the housing 16. This is accomplished, however, by rotating the housing around the axis of the stud arm 24. Thus, it can be seen that the position of the lever ends 74 and 82 remain the same. That is, as illustrated in FIG. 5, lever end 82 is always directly vertically above lever end 74 in each of the views. Similarly, shaft 32 does not rotate (although it does revolve around the axis of the arm stud 24). It therefore follows that the ends 86 and 94 of the levers 66 and 68 are always maintained in the same relationship to each other. Lever end 94 is always directly above lever end 86 and thus the tong head assembly 12 is always maintained in a precise vertical orientation.

If both of the levers 66 and 68 were straight, the tong arm assembly would only be able to swing through an arc of, at most, one hundred eighty degrees. This is due to size limitations of the housing, the diameter of the shaft 32 and the width of the levers. By curving the lever 68 in a substantial J-shape, the end of the lever can move around the shaft 32 so that the lever itself does not strike the shaft and interfere with the operation of the arm assembly. This is shown most clearly in the two right-hand views of FIG. 5. As a result of this arrangement, the tong arm assembly can be arranged to swing through an arc of well over one hundred eighty degrees. It should be pointed out that in an ideal installation it is not necessary for the tong arm to swing through an arc of greater than one hundred eighty degrees. However, in practice, this is very often necessary.

FIG. 5 illustrates the internal operation of the tong arm assembly 10. Of course, in operation, none of these internal components are visible. To prevent injury to personnel and to protect the tong arm assembly, the same is provided with a cover member 102 which is bolted to the frame 16 by a plurality of bolts 104. The cover member 102 includes an opening 106 therein which provides clearance for the pivot pins 88 and 96 of the head 36.

The present invention may be embodied in other specific forms without departing from the spirit or essential attributes thereof and accordingly, reference should be made to the appended claims rather than to the foregoing specification as indicating the scope of the invention.

I claim:

1. In a tong arm assembly for carrying and moving a tong head arcuately between two horizontally spaced positions while maintaining the orientation of said tong head, said tong arm assembly including a housing; means for rotating said housing about an arm stud passing into said housing adjacent one end thereof; means including a shaft for rotatably mounting a tong head to a second end of said housing; air passage means between said stud, said housing, said shaft and said tong head, and means within said housing interconnecting said stud and said tong head so as to maintain the orientation of said tong head while the same is being arcuately moved, the improvement comprising: said interconnecting means including a first rigid lever, one end of said first lever being pivotally connected to said arm stud at a point which is a first fixed radial distance from the axis of said stud, the other end of said first lever being pivotally connected to said tong head at a point spaced from the axis of said shaft the same first fixed radial distance, the angular positions of said points with respect to their respective stud and shaft axes being the same and a second rigid lever pivotally connected to each of said arm stud and said tong head at second points which are located at second fixed radial distances from the respective axes, the angular distances between the first mentioned and second pivot points with respect to said stud axis and with respect to said shaft axis being the same, one of said levers being curved at one end thereof so as to prevent interference with the stud or shaft with which it is associated.

2. The improvement as claimed in claim 1 wherein the angular distance between each first mentioned point and each second point is greater than zero degrees but less than one hundred eighty degrees.

* * * * *